(12) United States Patent
Pezeshki et al.

(10) Patent No.: US 11,737,058 B2
(45) Date of Patent: Aug. 22, 2023

(54) INDICATION OF NON-PREFERRED RESOURCES FOR SIDELINK COMMUNICATIONS

(71) Applicant: QUALCOMM Incorporated, San Diego, CA (US)

(72) Inventors: Hamed Pezeshki, San Diego, CA (US); Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 84 days.

(21) Appl. No.: 17/364,409

(22) Filed: Jun. 30, 2021

(65) Prior Publication Data

US 2023/0007627 A1 Jan. 5, 2023

(51) Int. Cl.
| | |
|---|---|
| *H04W 72/02* | (2009.01) |
| *H04W 72/541* | (2023.01) |
| *H04L 27/26* | (2006.01) |
| *H04W 72/0453* | (2023.01) |

(52) U.S. Cl.
CPC ........ *H04W 72/02* (2013.01); *H04L 27/2614* (2013.01); *H04W 72/0453* (2013.01); *H04W 72/541* (2023.01)

(58) Field of Classification Search
None
See application file for complete search history.

(56) References Cited

U.S. PATENT DOCUMENTS

| | | | |
|---|---|---|---|
| 2020/0281006 A1* | 9/2020 | Kumar | H04L 5/001 |
| 2021/0045093 A1* | 2/2021 | Rao | H04W 36/0009 |
| 2021/0144681 A1* | 5/2021 | Gulati | H04W 72/02 |
| 2021/0153198 A1* | 5/2021 | Zhang | H04W 72/0446 |
| 2021/0204100 A1* | 7/2021 | Lin | H04W 72/02 |
| 2022/0030575 A1* | 1/2022 | Farag | H04W 76/14 |
| 2022/0030647 A1 | 1/2022 | Lee et al. | |
| 2022/0095280 A1* | 3/2022 | Farag | H04W 72/1215 |
| 2022/0225288 A1* | 7/2022 | Park | H04W 72/0406 |
| 2022/0330267 A1* | 10/2022 | Hui | H04W 72/10 |

FOREIGN PATENT DOCUMENTS

| | | |
|---|---|---|
| WO | 2020145780 A1 | 7/2020 |
| WO | WO-2022081722 A1 * | 4/2022 |
| WO | WO-2022154939 A1 * | 7/2022 |

OTHER PUBLICATIONS

International Search Report and Written Opinion—PCT/US2022/035849—ISA/EPO—dated Oct. 10, 2022.

(Continued)

*Primary Examiner* — Kodzovi Acolatse
(74) *Attorney, Agent, or Firm* — Polsinelli LLP

(57) ABSTRACT

Disclosed are systems and techniques for wireless communications. For instance, a first user equipment (UE) can determine one or more parameters associated with sidelink communications between the first UE and a second UE. The first UE can determine, based on the one or more parameters, one or more non-preferred resources associated with the sidelink communications. The first UE can transmit an indication of the one or more non-preferred resources associated with the sidelink communications.

30 Claims, 10 Drawing Sheets

(56) References Cited

OTHER PUBLICATIONS

Mitsubishi Electric: "Inter-UE Coordination for Enhanced Resource Allocation", 3GPP TSG RAN WG1 #104b-e, R1-2102826, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 6, 2021, XP051993224, 12 Pages, p. 3, First Paragraph, p. 9, First Paragraph.
SONY: "Discussion on Reliability and Latency Enhancements for Mode 2", 3GPP TSG RAN WG1 #104b-e, R1-2103315, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 7, 2021, XP052178082, 6 Pages, Section 2.1., p. 3, after Proposal 1.

\* cited by examiner

INDICATION OF NON-PREFERRED RESOURCES FOR SIDELINK COMMUNICATIONS

FIELD OF THE DISCLOSURE

The present disclosure generally relates to wireless communications. For example, aspects of the present disclosure relate to systems and techniques for indicating non-preferred resources for sidelink communications.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards. Aspects of 5G mobile communications may support direct communications between devices, which may be referred to as sidelink communications. Sidelink can also be referred to as PC5. Wi-Fi also includes a protocol for direct device-to-device communications, referred to as a Dedicated Short Range Communication (DSRC) protocol.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for wireless communications at a first user equipment (UE) is provided. The method includes: determining, by the first UE, one or more parameters associated with sidelink communications between the first UE and a second UE; determining, by the first UE and based on the one or more parameters, one or more non-preferred resources associated with the sidelink communications; and transmitting an indication of the one or more non-preferred resources associated with the sidelink communications.

In another example, an apparatus for wireless communication is provided that includes at least one memory, at least one transceiver, and at least one processor (e.g., implemented in circuitry) coupled to the at least one memory and the at least one transceiver. The at least one processor is configured to: determine one or more parameters associated with sidelink communications between the apparatus and a user equipment (UE); determine, based on the one or more parameters, one or more non-preferred resources associated with the sidelink communications; and transmit, via the at least one transceiver, an indication of the one or more non-preferred resources associated with the sidelink communications In another example, a non-transitory computer-readable medium is provided for performing wireless communications, which has stored thereon instructions that, when executed by one or more processors, cause the one or more processors to: determine one or more parameters associated with sidelink communications between a first user equipment (UE) and a second UE; determine, based on the one or more parameters, one or more non-preferred resources associated with the sidelink communications; and transmit an indication of the one or more non-preferred resources associated with the sidelink communications.

In another example, an apparatus for wireless communications is provided. The apparatus includes: means for determining one or more parameters associated with sidelink communications between the apparatus and a UE; means for determining, based on the one or more parameters, one or more non-preferred resources associated with the sidelink communications; and means for transmitting an indication of the one or more non-preferred resources associated with the sidelink communications.

In another illustrative example, a method of performing wireless communications is provided. The method includes: determining, by a base station, a first set of sidelink transmission resources allocated for sidelink communications between a first user equipment (UE) and a second UE; receiving, by the base station, an indication of one or more non-preferred resources from the first set of sidelink transmission resources; and determining, by the base station and based on the indication, a second set of sidelink transmission resources.

In another example, an apparatus for wireless communications is provided that includes at least one memory, at least one transceiver, and at least one processor (e.g., implemented in circuitry) coupled to the at least one memory and the at least one transceiver. The at least one processor is configured to: determine a first set of sidelink transmission resources allocated for sidelink communications between a first user equipment (UE) and a second UE; receive, via the at least one transceiver, an indication of one or more non-preferred resources from the first set of sidelink transmission resources; and determining, based on the indication, a second set of sidelink transmission resources.

In another example, a non-transitory computer-readable medium is provided for performing wireless communications, which has stored thereon instructions that, when executed by one or more processors, cause the one or more processors to: determine a first set of sidelink transmission resources allocated for sidelink communications between a first user equipment (UE) and a second UE; receive an indication of one or more non-preferred resources from the first set of sidelink transmission resources; and determine, based on the indication, a second set of sidelink transmission resources.

In another example, an apparatus for performing sidelink communications is provided. The apparatus includes: means for determining a first set of sidelink transmission resources allocated for sidelink communications between a first user equipment (UE) and a second UE; means for receiving an indication of one or more non-preferred resources from the first set of sidelink transmission resources; and means for determining, based on the indication, a second set of sidelink transmission resources.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device having a radio frequency (RF) interface. In some aspects, the apparatus is or is part of a base station (e.g., a 3GPP gNodeB (gNB) for 5G/NR, a 3GPP eNodeB (eNB) for LTE, a Wi-Fi access point (AP), or other base station). In some aspects, the apparatus includes a transceiver configured to transmit and/or receive radio frequency (RF) signals. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
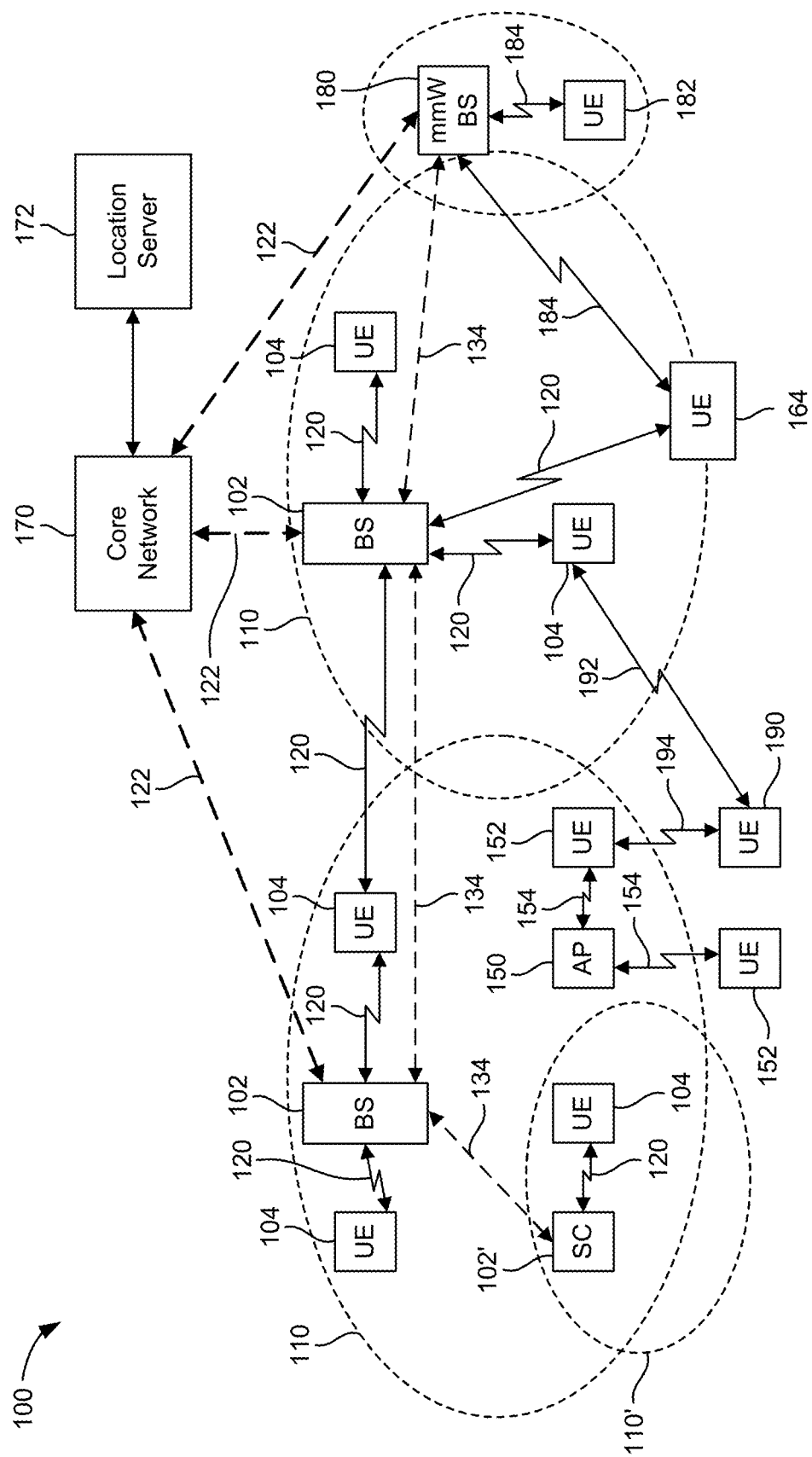
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station). In one example, an access link between a UE and a 3GPP gNB can be over a Uu interface. In some cases, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHz). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some examples, sidelink communications can be performed in a first mode (e.g., mode 1) in which a base station allocates the resources (e.g., time and/or frequency resources such as frame, sub-frame, sub-carrier, resource block, resource element, etc.) that are used for the sidelink transmissions. In some cases, sidelink communications can be performed in a second mode (e.g., mode 2) in which a UE can autonomously select the resources that are used for the sidelink transmissions. In some examples, one or more of the time and/or frequency resources that are allocated for sidelink communications (e.g., by a base station or by a UE) may result in degraded performance. In some instances, degraded performance of sidelink communications can be due to frequency selectivity of a channel, inter-cell interference, interference from other sidelink transmissions, environmental factors, device position, device mobility, etc. For example, a first UE may experience interference on its sidelink communications from a second UE that is served by a different base station and that is scheduled to use one or more resources that overlap with resources used by the first UE. In some cases, identifying time and/or frequency resources that are associated with poor performance (e.g., interference, frequency selectivity, etc.) and avoiding use of these non-preferred resources can improve sidelink communications.

Systems, apparatuses, processes (also referred to as methods), and computer-readable media (collectively referred to as "systems and techniques") are described herein for performing wireless communications and determining (e.g., identifying, indicating, classifying) non-preferred time and/or frequency resources associated with sidelink communications. The systems and techniques provide the ability for a base station and/or a UE to obtain measurements and/or parameters associated with sidelink communications and determine non-preferred time and/or frequency resources that can be avoided and/or deprioritized in subsequent sidelink transmissions.

In some aspects, a user equipment (UE) device can be configured to monitor performance of sidelink reception by taking measurements and collecting data associated with sidelink communications received from one or more other UEs (referred to herein as sidelink receptions). For example, a UE can measure signal strength, signal to interference ratio, signal to noise ratio, signal throughput, location data, environmental factors, and/or other measurements/parameters associated with sidelink receptions and can associate each of these measurements/parameters with one or more of the time and/or frequency resources used in the corresponding sidelink receptions. In some aspects, a UE can determine non-preferred resources based on the parameters/measurements and/or a UE can determine a preference level that is associated with the resources. In some examples, a UE can implement machine learning algorithms (e.g., a neural network) that can be used for determining the non-preferred resources and/or for assigning a preference level to one or more of the resources.

In some cases, the UE can provide an indication of the non-preferred resource(s) to a base station and/or to a transmitting UE (e.g., a different UE that transmitted one or more sidelink communications to the receiving UE). For example, in a mode 1 configuration (where a base station allocates resources, as described above), the UE can send an indication of the non-preferred resource(s) to the base station and the base station can provide a new allocation of resource(s) that can exclude one or more of the non-preferred resource(s). In another example, in a mode 2 configuration (where the UE can autonomously select the resources, as described above), the UE can send an indication of the non-preferred resource(s) to the transmitting UE and the transmitting UE can select new resources that can exclude one or more of the non-preferred resources.

In some aspects, the indication from the receiving UE to the base station (e.g., in a mode 1 configuration) and/or the transmitting UE (e.g., in a mode 2 configuration) can include measurement data corresponding to the sidelink communications. In one illustrative example, the indication can include channel state information (CSI) associated with the sidelink communications. In some examples, the base station and/or the transmitting UE can implement machine learning algorithms (e.g., one or more neural networks) that can be used for determining the non-preferred resources and/or for assigning a preference level to one or more of the resources. For instance, a neural network can be configured on the base station and/or the transmitting UE, such as using a neural processing unit (NPU) or other chip or component that can execute the neural network. Using the measurement data (e.g., CSI data) in the indication as input, the neural network can determine non-preferred resource(s) and/or can assign a preference level to resource(s).

Various aspects of the systems and techniques will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

In some aspects, the radio resources that are selected and used for sidelink communications may be undesirable due to factors such as interference (e.g., inter-cell interference, inter-UE interference, channel frequency selectivity, etc.). In some examples, a receiving UE (e.g., UE 190) may identify non-preferred (e.g., undesirable) resources and provide an indication to the base station (e.g., base station 102) and/or the transmitting UE (e.g., UE 104) of the non-preferred resources. In some cases, the base station (e.g., base station 102) and/or the transmitting UE (e.g., UE 104) can select and/or allocate one or more radio resources that exclude non-preferred resources.

Figure 2:
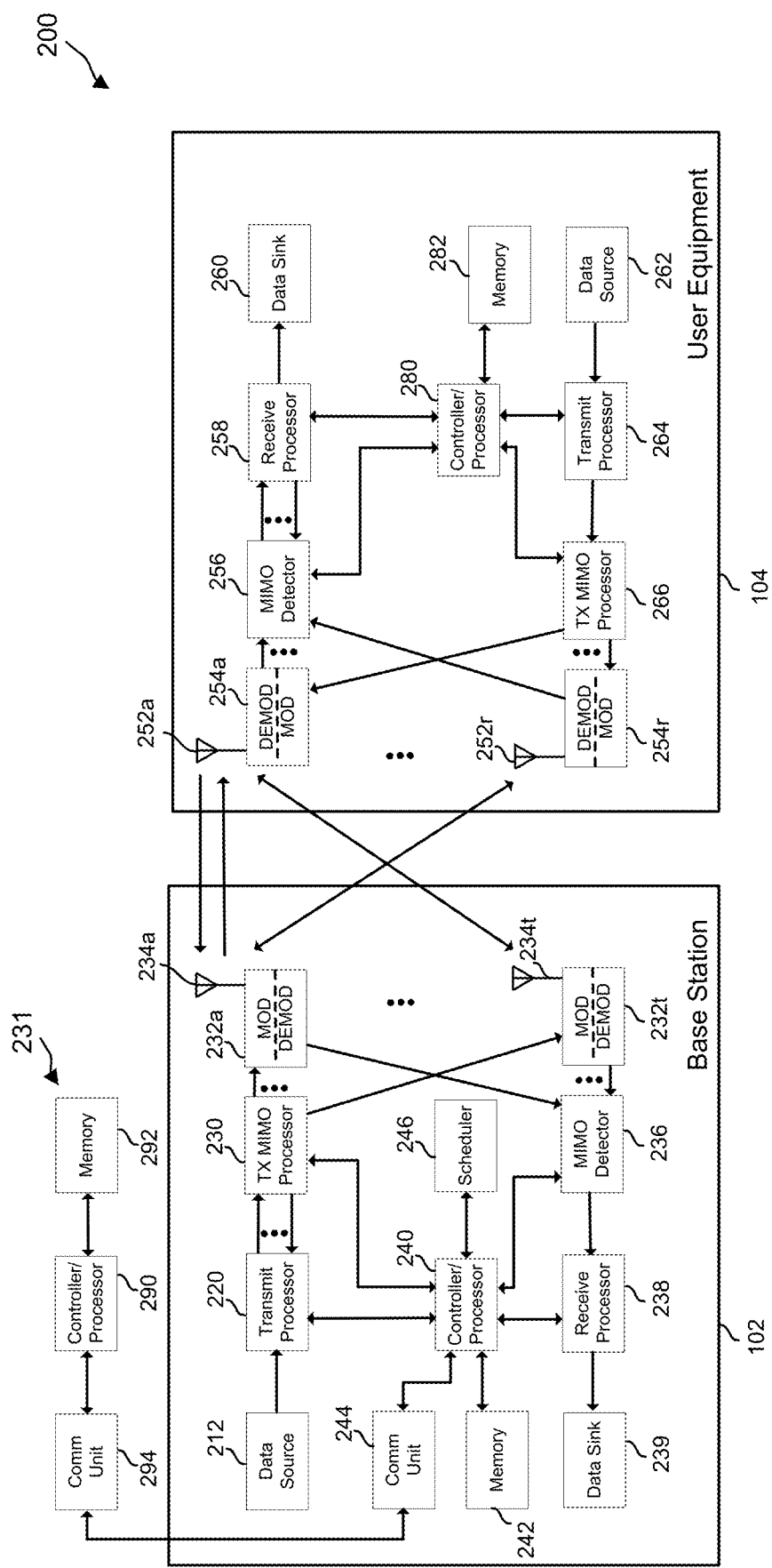
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some implementations, the UE 104 may include means for determining one or more parameters associated with sidelink communications between the UE and a second UE; means for determining, based on the one or more parameters, one or more non-preferred resources associated with the sidelink communications; and means for transmitting an indication of the one or more non-preferred resources associated with the sidelink communications. In some examples, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

In some implementations, the base station 102 may include means for determining a first set of sidelink transmission resources allocated for sidelink communications between a first user equipment (UE) and a second UE; means for receiving an indication of one or more non-preferred resources from the first set of sidelink transmission resources; and means for determining, based on the indication, a second set of sidelink transmission resources. In some examples, the means for determining can include controller/processor 240, memory 242, transmit processor 220, receive processor 238, any combination thereof, or any other components of the base station 102. In some examples, the means for receiving can include controller/processor 240, receive processor 238, MIMO detector 236, DEMODs 232a through 232t, antennas 234a to 234t, any combination thereof, or any other component(s) of the base station 102.

Figure 3:
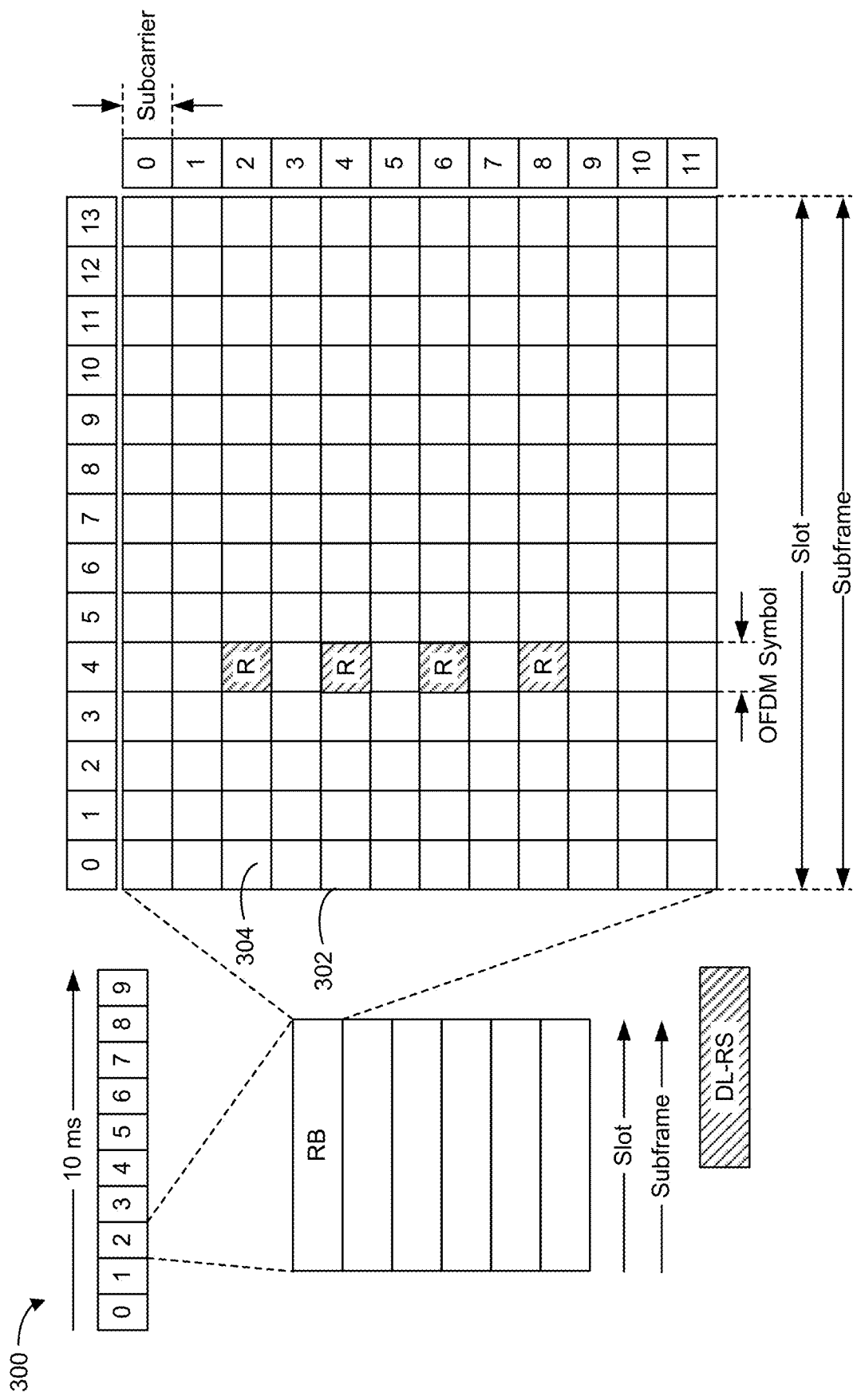
FIG. 3 is a diagram illustrating an example of a frame structure, in accordance with some examples.

Various radio frame structures may be used to support downlink, uplink, and sidelink transmissions between network nodes (e.g., base stations and UEs). FIG. 3 is a diagram 300 illustrating an example of a frame structure, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ). For example, subcarrier spacing (SCS) of 15 kHz, 30 kHz, 60 kHz, 120 kHz, and 240 kHz or greater may be available. Table 1 provided below lists some various parameters for different NR numerologies.

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. The resource grid is further divided into multiple resource elements (REs). Referring to FIG. 3, the RB 302 includes multiple REs, including the resource element (RE) 304. The RE 304 may correspond to one symbol length in the time domain and one subcarrier in the frequency domain. In the numerology of FIG. 3, for a normal cyclic prefix, RB 302 may contain 12 consecutive subcarriers in the frequency domain and seven consecutive symbols in the time domain, for a total of 84 REs such as RE 304. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs used to transmit DL-RS (labeled "R").

In some aspects, one or more resources in the resource grid can be used to perform sidelink communications. For example, sidelink communications can be implemented using a mode (e.g., mode 1) in which a base station (e.g., base station 102) can designate/select one or more resources (e.g., resource elements (e.g., RE 304), resource blocks (e.g., RB 302), subcarriers, symbols, frames, sub-frames, etc.) for sidelink communications. In another example, sidelink communications can be implemented using a mode (e.g., mode 2) in which a UE (e.g., UE 104) can designate/select one or more resources (e.g., resource elements (e.g., RE 304), resource blocks (e.g., RB 302), subcarriers, symbols, frames, sub-frames, etc.) for sidelink communications.

As noted above, systems and techniques are described herein for determining non-preferred resources for sidelink communications and/or for assigning a preference level to resources for sidelink communications. In some cases, the systems and techniques can be implemented by a base station, such as the base station 102. In some examples, the systems and techniques can be implemented by a UE, such as the UE 104. The systems and techniques (e.g., the base station and/or the UE) can determine and communicate non-preferred resources for sidelink communications based on current and/or prior conditions (e.g., parameters, measurements, etc.) associated with the sidelink communications. In some examples, the systems and techniques (e.g., the base station and/or the UE) can utilize a trained machine learning model (e.g., one or more neural networks) for determining non-preferred resources for sidelink communications and/or for determining a preference level associated with one or more resources for sidelink communications.

TABLE 1

| | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

Figure 4:
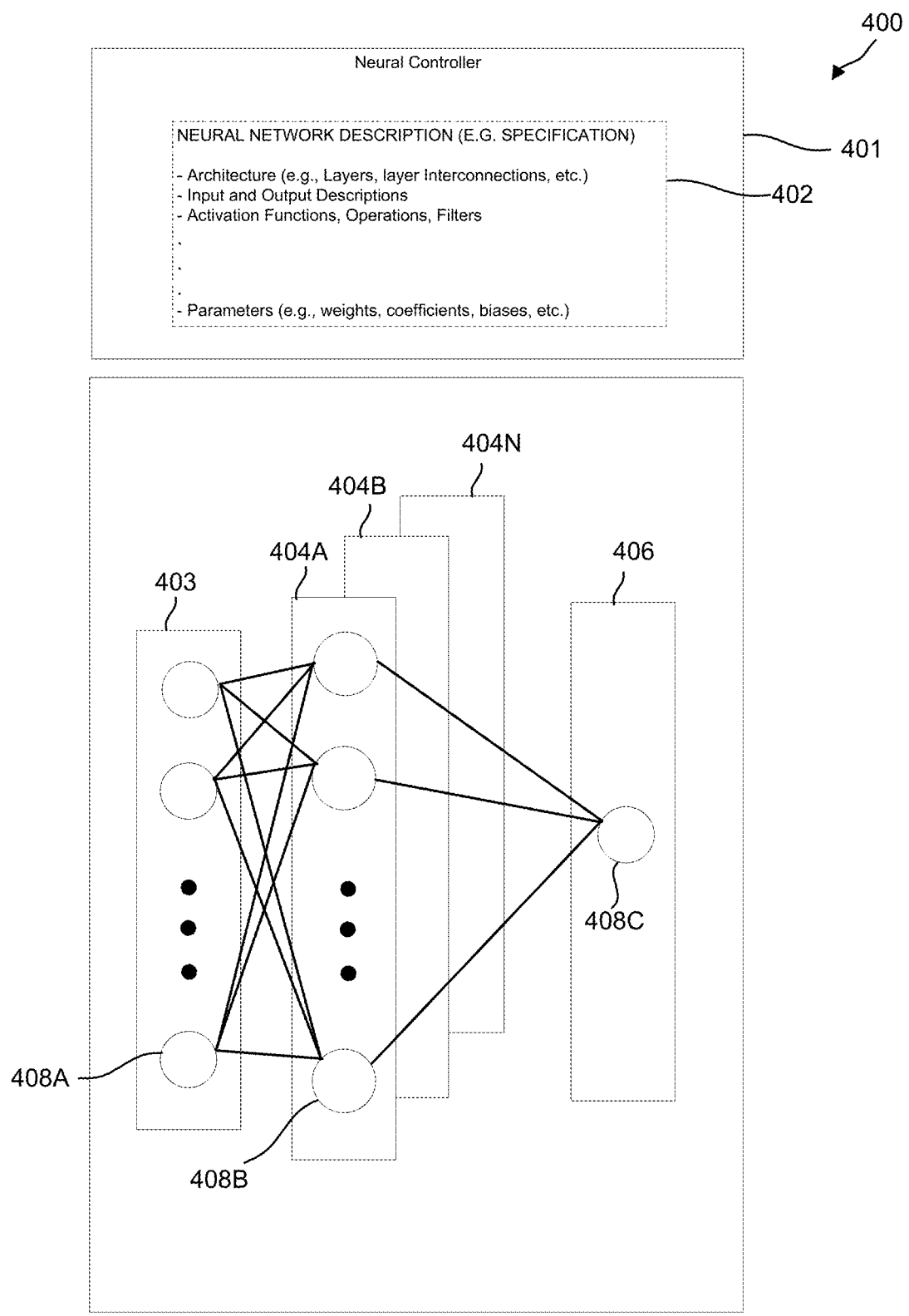
FIG. 4 is a diagram illustrating an example machine learning model that can be configured to determine non-preferred resources for sidelink communications, in accordance with some examples.

FIG. 4 illustrates an example neural architecture of a neural network 400 that can be trained for determining and/or indicating non-preferred resources for sidelink communications, in accordance with some aspects of the present disclosure. The example neural architecture of the neural network 400 may be defined by an example neural network description 402 in neural controller 401. The neural network 400 is an example of a machine learning model that can be deployed and implemented at the base station 102 and/or the UE 104. The neural network 400 can be a feedforward neural network or any other known or to-be-developed neural network or machine learning model.

The neural network description 402 can include a full specification of the neural network 400, including the neural architecture shown in FIG. 4. For example, the neural network description 402 can include a description or specification of architecture of the neural network 400 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 400 can reflect the neural architecture defined in the neural network description 402. The neural network 400 can include any suitable neural or deep learning type of network. In some cases, the neural network 400 can include a feed-forward neural network. In other cases, the neural network 400 can include a recurrent neural network, which can have loops that allow information to be carried across nodes while reading in input. The neural network 400 can include any other suitable neural network or machine learning model. One example includes a convolutional neural network (CNN), which includes an input layer and an output layer, with multiple hidden layers between the input and out layers. The hidden layers of a CNN include a series of hidden layers as described below, such as convolutional, nonlinear, pooling (for downsampling), and fully connected layers. In other examples, the neural network 400 can represent any other neural or deep learning network, such as an autoencoder, a deep belief nets (DBNs), a recurrent neural network (RNN), etc.

In the non-limiting example of FIG. 4, the neural network 400 includes an input layer 403, which can receive one or more sets of input data. The input data can be any type of data such as one or more parameters associated with a communication channel (e.g., D2D P2P link 192 or sidelink communication channel between UE 104 and UE 190 such as channel state information (CSI), received signal strength, signal to interference ratio, signal to noise ratio, signal throughput, location data, environmental conditions, UE mobility status, etc.), previously used resources for sidelink communications (e.g., frame, sub-bands, resource element, resource blocks, etc.), etc.

The neural network 400 can include hidden layers 404A through 404N (collectively "404" hereinafter). The hidden layers 404 can include n number of hidden layers, where n is an integer greater than or equal to one. The n number of hidden layers can include as many layers as needed for a desired processing outcome and/or rendering intent. In one illustrative example, any one of the hidden layer 404 can include data representing one or more of the data provided at the input layer 403 such as one or more parameters associated with a communication channel (e.g., D2D P2P link 192 or sidelink communication channel between UE 104 and UE 190 such as channel state information, received signal strength, signal to interference ratio, signal to noise ratio, signal throughput, location data, environmental conditions, UE mobility status, etc.), previously used resources for sidelink communications (e.g., frame, sub-bands, resource element, resource blocks, etc.), etc.

The neural network 400 further includes an output layer 406 that provides an output resulting from the processing performed by hidden layers 404. The output layer 406 can provide output data based on the input data. In one example, in the context related to a determination and/or indication of non-preferred resources for sidelink communications, the output can include a preference level for one or more resources (e.g., frequency subcarrier(s), resource element(s), resource block(s), etc.) that can be used for sidelink communications. In some aspects, the preference level can indicate that one or more resources are non-preferred resources.

In the example of FIG. 4, the neural network 400 is a multi-layer neural network of interconnected nodes. Each node can represent a piece of information. Information associated with the nodes is shared among the different layers and each layer retains information as information is processed. Information can be exchanged between the nodes through node-to-node interconnections between the various layers. The nodes of the input layer 403 can activate a set of nodes in the first hidden layer 404A. For example, as shown, each input node of the input layer 403 is connected to each node of the first hidden layer 404A. The nodes of the hidden layer 404A can transform the information of each input node by applying activation functions to the information. The information derived from the transformation can then be passed to and can activate the nodes of the next hidden layer (e.g., 404B), which can perform their own designated functions. Example functions include convolutional, up-sampling, data transformation, pooling, and/or any other suitable functions. The output of hidden layer (e.g., 404B) can then activate nodes of the next hidden layer (e.g., 404N), and so on. The output of last hidden layer can activate one or more nodes of the output layer 406, at which point an output is provided. In some cases, while nodes (e.g., nodes 408A, 408B, 408C) in the neural network 400 are shown as having multiple output lines, a node has a single output and all lines shown as being output from a node represent the same output value.

In some cases, each node or interconnection between nodes can have a weight that is a set of parameters derived from training the neural network 400. For example, an interconnection between nodes can represent a piece of information learned about the interconnected nodes. The interconnection can have a numeric weight that can be tuned (e.g., based on a training dataset), allowing the neural network 400 to be adaptive to inputs and able to learn as more data is processed.

The neural network 400 can be pre-trained to process the features from the data in the input layer 403 using different hidden layers 404 in order to provide the output through the output layer 406. For example, in some cases, the neural network 400 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

Once trained, the neural network 400 can receive as input one or more parameters associated with a communication channel between the UE 104 and UE 190. Such parameters can include, but are not limited to, parameters and/or measurements associated with sidelink communications (e.g., channel state information, received signal strength, signal to interference ratio, signal to noise ratio, signal throughput, location data, etc.), environmental conditions in which UE 104 and UE 190 are performing sidelink communications (e.g., weather conditions, indoor/outdoor channel conditions, and/or cellular or wireless connectivity, transmission capabilities and power of the base station 102 and/or the UE 104, etc.), mobility status of the UE 104 and/or the UE 190 (e.g., movement of a UE with respect to another UE and/or base station), multipath characteristics of the channel, and/or various measurements made by the UE with respect to previous sidelink communications, previously used resources for sidelink communications (e.g., frame, subbands, resource element, resource blocks, etc.), etc.

Once trained, the neural network 400 can log parameters, channel conditions, signal measurements, and/or other information (e.g., UE position, etc.), and can associate the same with various time and/or frequency resources used for sidelink communications. As noted herein, the channel conditions can include indoor and/or outdoor channel conditions, UE mobility status, multipath channel characteristics, and/or other channel conditions, or any combination thereof. For example, the trained neural network 400 can determine which resources were used for sidelink communications that are associated with particular measurements, parameters, metrics, etc., and can identify a preference level (e.g., non-preferred, preferred, etc.) that is associated with those resources so that they can be used in the future. In some examples, the trained neural network 400 may be continuously updated or retrained (e.g., using an online learning approach). For example, trained neural network may be configured to be optimized each time sidelink communications are received.

As will be described below, the trained neural network 400 can be deployed at the UE 104, at the base station 102, or at the UE 104 and the base station 102 in some cases. In one example, when the machine learning model is deployed at the base station 102, the base station 102 may receive the one or more input parameters (e.g., measurements, channel state information, etc.) from the UE 104 and determine the non-preferred resources as output of the trained neural network.

As noted above, the output of the trained neural network 400, whether implemented at the base station 102 and/or the UE 104, can identify non-preferred resources (e.g., frequency subcarrier(s), resource element(s), resource block(s), etc.) for sidelink communications. In some aspects, the output of the trained neural network 400 can be a preference level that is associated with one or more resources associated with sidelink communications. For example, the preference level can assign a priority or a range of priorities to the one or more resources.

Figure 5:
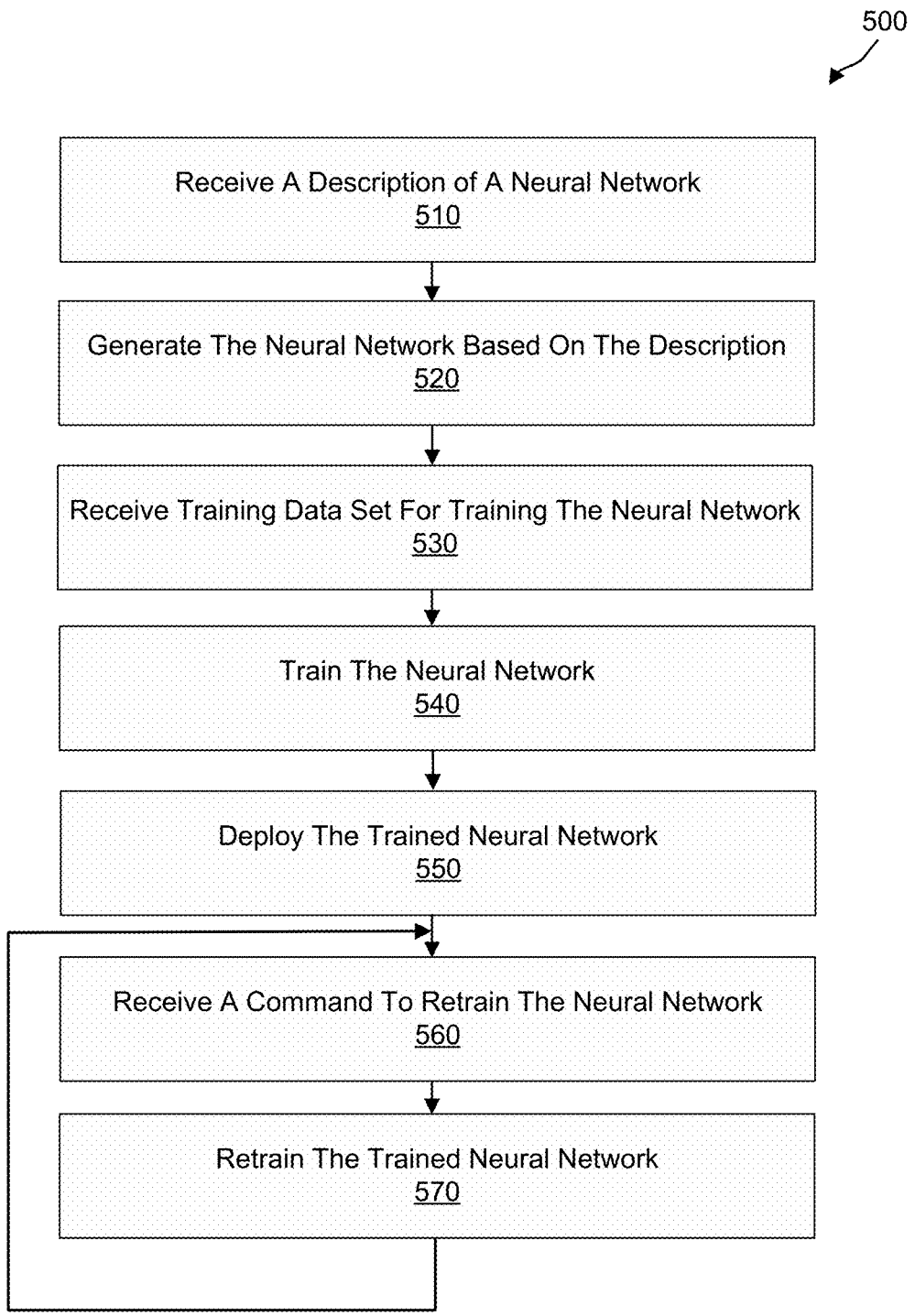
FIG. 5 is a flow chart illustrating an example of a process of training a machine learning algorithm for determining non-preferred resources for sidelink communications, in accordance with some examples.

FIG. 5 is a flow chart of a process 500 of training a machine learning algorithm, such as neural network 400, for determining non-preferred resources for side link communications, in accordance with some aspects of the present disclosure. Operation of FIG. 5 will be described in relation to FIG. 4. Neural network 400 may be implemented at the base station 102 or the UE 104.

At operation 510, the neural controller 401 receives a description of the structure of the neural network 400 (e.g., from base station 102) including, but not limited to, the architecture of the neural network 400 and definition of layers, layer interconnections, input and output descriptions, activation functions, operations, filters, parameters such as weights, coefficients, biases, etc. In some examples, the description can be received from a device based on a user input received by the device (e.g., input via an input device, such as a keyboard, mouse, touchscreen interface, and/or other type of input device). In some examples, operation 510 is optional and may not be performed. For example, the neural network 400 can be UE specific (e.g., executed by the UE) and thus the description and specific configurations of the neural network 400 may be provided by the UE 104. At operation 520, the neural network 400 is generated based on the description received at operation 510. Using the description, the neural controller 401 generates appropriate input, intermediate, and output layers with defined interconnections between the layers and/or any weights or other parameters/coefficients assigned thereto. The weights and/or other parameters/coefficients can be set to initialized values, which will be modified during training, as described below. In some examples, operation 520 is optional and may not be performed (e.g., when the neural network 400 is UE specific).

At operation 530, once the neural network 400 is defined, a training data set is provided to the input layer 403 of the neural network 400. As described above, the training data set can include, but is not limited to, UE signal measurements, sidelink resource allocation (e.g., time and/or frequency resources), environmental conditions, UE mobility status, etc. In some examples, there may not be an explicitly dedicated training data set for the purpose of training the neural network 400 or the training data set may not necessarily be a predetermined set of signal measurements and resources. For instance, in some cases, the neural network 400 may instead be trained using information associated with conditions under which the UE 104 and the UE 190 are communicating. In such examples, the real-time data can be used for live training of the neural network 400, for example, using an online-learning approach.

At operation 540, the neural network 400 is trained using the training data set. In one example, the training of the neural network 400 is an iterative process repeated multiple times and each time validated against a test data set. The test data set may include a set of one or more parameters similar to those used as part of the training dataset and associated output preference levels for one or more resources. During each iteration, the output at the output layer 406 can be compared to the test data set and a delta between the output at the output layer 406 at that iteration and the optimized output defined in the test data set is determined. The weights and other parameters or coefficients of the various layers can be adjusted based on the delta. The iterative process may continue until the delta for any given set of input parameters is less than a threshold. The threshold may be a configurable parameter determined based on experiments and/or empirical studies.

At operation 550 and once the neural network 400 is trained, the trained neural network 400 is deployed at the base station 102 and/or the UE 104. The trained neural network, as will be described below, can then be used to determine a preference level (e.g., non-preferred) for one or more resources used for sidelink communications (e.g., D2D P2P link 192 or sidelink communication channel between UE 104 and UE 190). As the measurements change, the receiving device (e.g., the base station 102 or the UE 104 on which the trained neural network 400 is deployed) can re-train the neural network 400 to determine updated preference levels for one or more resources associated with sidelink communications.

At operation 560, a triggering condition for retraining the neural network 400 is detected. The command may be received after the trained neural network 400 is deployed and after each instance of determining a preference level for one or more resources for sidelink communications. At operation 570, the neural network 400 is retrained using the resources (e.g., subcarrier, resource element, resource block, etc.) for sidelink communications and the corresponding measurements (e.g., received signal strength, signal to interference ratio, signal to noise ratio, signal throughput, location data, etc.) received as part of the command at operation 560.

Retraining the neural network 400 may include adjusting weights, coefficients, biases, and/or parameters at different nodes of the different layers of the neural network 400. The operation 560 and 570 (the retraining of the neural network 400) may be continuously repeated, thus resulting in increased accuracy of the neural network 400 over time. Operations 560 and 570 are optional, and in some cases may not be performed.

Figure 6:
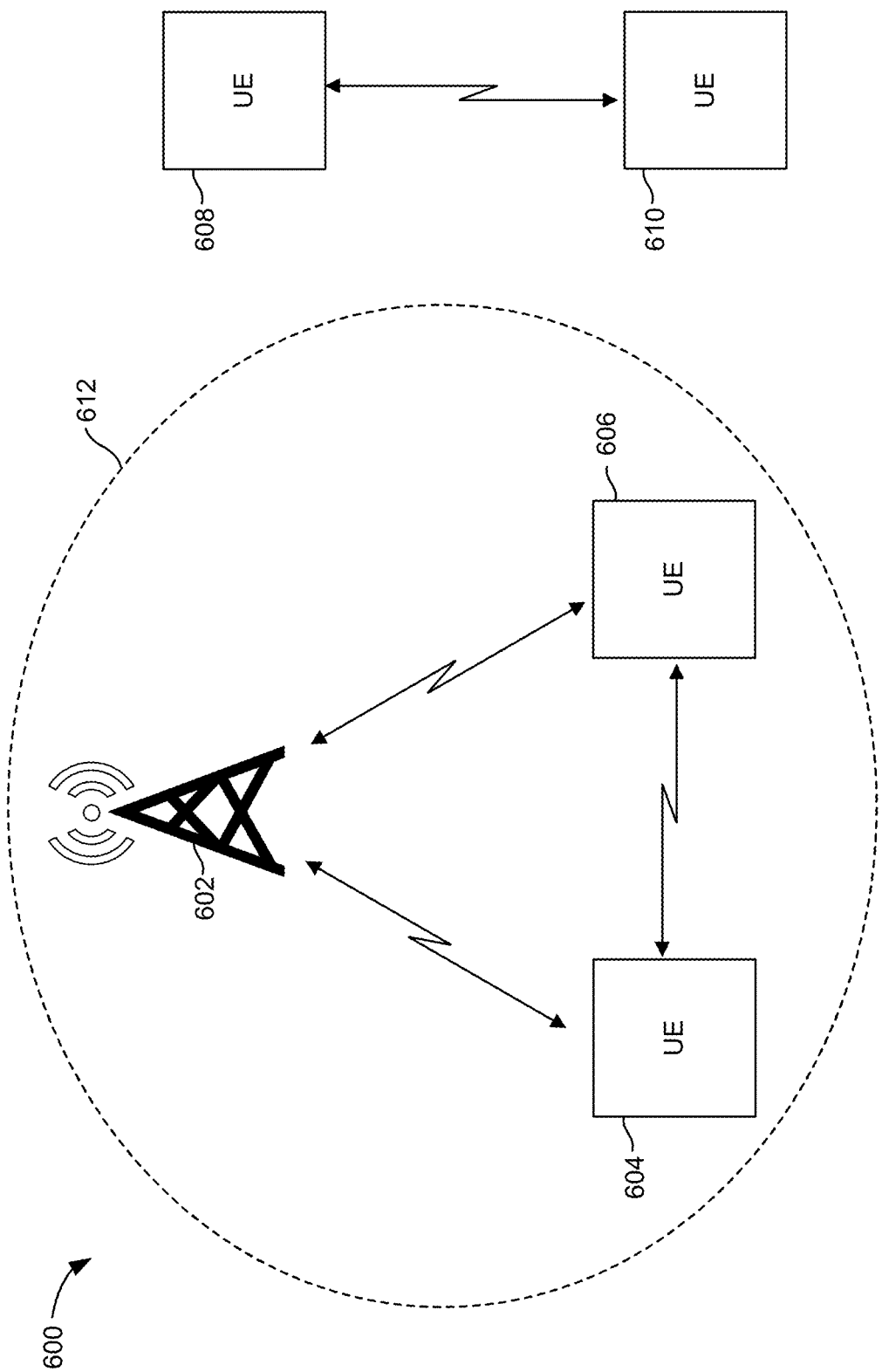
FIG. 6 is a block diagram illustrating another example of a wireless communication network, in accordance with some examples.

FIG. 6 illustrates an example of a wireless communication system 600 including devices configured to perform sidelink communications. While the system 600 is described using user equipment (UE) and base stations (BSs) as illustrative examples, the techniques described with respect to the system 600 can be performed by Wi-Fi stations (STA) and access points (APs) or by other devices that communicate using other communication protocols.

As illustrated, the system 600 includes a base station 602 that can be associated with coverage area 612. In some aspects, base station 602 can include macro cell base stations and/or small cell base stations, as described in connection with system 100 (e.g., base stations 102). In other aspects, base station 602 can include a wireless access point, such as, for example, AP 150 described in connection with system 100.

In some examples, system 600 can include one or more user equipment (UE) devices, such as UE 604 and UE 606 that are within coverage area 612 of base station 602 and UE 608 and UE 610 that are outside of coverage area 612. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE can include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 604 and UE 606 can communicate with base station 602 in uplink (UL) and/or downlink (DL) directions. DL refers to the transmission direction from base station 602 to a UE, and UL refers to the transmission direction from a UE (e.g., UE 604, UE 606) to base station 602. In some examples, UE 604 and UE 606 may utilize sidelink communications to communicate directly with each other, and UE 608 and UE 610 may also utilize sidelink communications to communicate directly with each other.

In some cases, UE 604, UE 606, UE 608, and UE 610 may use one or more physical sidelink channels to perform sidelink communications. For example, the Physical Sidelink Control Channel (PSCCH) can be used to carry sidelink control information (SCI) which contains information about the resource allocation on the Physical Sidelink Shared Channel (PSSCH). The PSSCH can be used to carry sidelink data as well as additional control information. The Physical Sidelink Feedback Channel (PSFCH) can be used to provide feedback related to the successful or failed reception of a sidelink transmission. The Physical Sidelink Broadcast Channel (PSBCH) can be used to carry information for supporting synchronization in the sidelink.

In some examples, UE 604, UE 606, UE 608, and UE 610 can use one or more signals to facilitate sidelink communications. For example, a demodulation reference signal (DMRS) can be used by a receiver to decode an associated physical channel (e.g., DMRS for PSCCH; DMRS for PSSCH; DMRS for PSBCH). In some cases, a sidelink primary synchronization signal (S-PSS) and/or a sidelink secondary synchronization signal (S-SSS) can be used by a receiver to synchronize the receiver to the transmitter of the signals. In some aspects, a sidelink channel state information reference signal (SL CSI-RS) can be used for measuring channel state information (CSI) at the receiver that can then be provided to the transmitter as feedback that can be used for adjusting transmission parameters. In some aspects, a sidelink phase-tracking reference signal (SL PT-RS) can be used to mitigate effects of phase noise (e.g., due to oscillator limitations).

In some examples, UE 604 and UE 606 can be configured to perform sidelink communications using a mode (e.g., mode 1) in which base station 602 can assign and manage the sidelink radio resources. In some cases, base station 602 can allocate radio resources for sidelink communications based on dynamic grant (DG) scheduling, in which a UE requests resources for transmission of a transport block (TB). For instance, UE 604 and/or UE 606 can send a scheduling request to base station 602 (e.g., using Physical Uplink Control Channel (PUCCH)). The base station 602 can respond with an indication of the sidelink resources (e.g., slot(s), sub-channel(s), etc.) allocated for the sidelink transmission of the TB. In some cases, the base station 602 can provide the indication of the sidelink resources using the Downlink Control Information (DCI) transmitted over the Physical Downlink Control Channel (PDCCH).

In some cases, the base station 602 can allocate radio resources for sidelink communications based on configured grant (CG) scheduling. For instance, the UE 604 and/or the UE 606 can send a message to the base station 602 indicating information about the sidelink transmission (e.g., periodicity of TBs, TB maximum size, Quality of Service (QoS) information, etc.) and the base station 602 can allocate a CG that satisfies the UE requirements. In some examples, the CG allocation of sidelink resources (e.g., slot(s), sub-channels, etc.) can be provided to a UE using radio resource control (RRC) signaling.

In some aspects, the UE 604 and the UE 606 can perform sidelink communications using the sidelink resources allocated by the base station 602. In one illustrative example, the UE 604 can be configured to transmit one or more sidelink transmissions (e.g., using time and/or frequency resource allocated by base station 602) and the UE 606 can be configured to receive the one or more sidelink transmissions. In some aspects, the UE 606 can perform one or more measurements associated with the sidelink communications. For example, the UE 606 can measure received signal strength, signal to interference ratio, signal to noise ratio, signal throughput, location data, environmental conditions, mobility status, serving cell signal strength, neighbor cell signal strength, etc.

In some examples, the UE 606 can use one or more of the measurements associated with the sidelink communications to identify non-preferred resources (e.g., slot(s), frame(s), frequency sub-carrier(s), resource element(s), resource block(s), etc.) associated with the sidelink transmissions. In some aspects, one or more time and/or frequency resources may be determined to be non-preferred due to frequency selectivity of the channel, inter-cell interference, interference due to other sidelink transmissions (e.g., UE performing sidelink autonomously in mode 2), location, environmental conditions, etc. In one example, the UE 606 can determine that sidelink transmissions corresponding to a particular frequency sub-carrier are associated with poor signal to noise ratio. Based on determining that the sidelink transmissions corresponding to the particular frequency sub-carrier are associated with poor signal to noise ratio, the UE 606 can determine that the particular frequency sub-carrier is a non-preferred resource. In another example, the UE 606 can determine that sidelink transmission corresponding to a particular slot are associated with poor signal throughput when the UE 606 is in close proximity to a neighboring base station (not illustrated). In that instance, the UE 606 can determine that the particular slot is a non-preferred resource when it is in close proximity to the neighboring cell.

In some aspects, the UE 606 can determine a preference level for one or more time and/or frequency resources based on measurements associated with the sidelink transmissions. In some cases, the preference level can indicate whether a resource is preferred or non-preferred. In some examples, the preference level can correspond to a quantized level or ranking based on a scale (e.g., zero to five) that indicates a level of preference (e.g., most preferable to least preferable). In some examples, the preference level associated with one or more resources can be based on a plurality of measurements obtained over a period of time. In some cases, the preference level associated with one or more resources can be updated periodically (e.g., measurements obtained at pre-determined time intervals) or on-demand (e.g., the UE 606 detects a change in one or more conditions).

In some examples, the UE 606 can determine a preference level for one or more resources using one or more machine learning or artificial intelligence models or algorithms, as described above. In one illustrative example, the UE 606 can implement a neural network (e.g., the neural network 400) that can be used to identify non-preferred time and/or frequency resources used for sidelink communications and/or to assign a preference level to time and/or frequency resources used for sidelink communications. As noted above, the neural network can receive as input one or more of the measurements associated with sidelink communications (e.g., received signal strength, signal to interference ratio, signal to noise ratio, signal throughput, location data, environmental conditions, mobility status, serving cell signal strength, neighbor cell signal strength, etc.). Using the one or more measurements associated with the sidelink communications as input, the neural network can associate those measurements with the time and/or frequency resources used for the sidelink communications. In some aspects, the neural network on UE 606 can continue to learn and dynamically update preference levels for time-frequency resources over a period of time. In some aspects, UE 606 can determine non-preferred resources for sidelink communications using any other type of artificial intelligence algorithm and/or any other processing or statistical analysis of the measurements associated with the sidelink communications.

In some aspects, the UE 606 can transmit an indication of non-preferred time and/or frequency resources to the base station 602 and/or to the UE 604. In some examples, the base station 602 can receive the indication from the UE 606 and can exclude non-preferred time and/or frequency resources from a subsequent sidelink resource allocation to the UE 606 (and/or to another UE in some cases). In some cases, the base station 602 can receive the indication from the UE 606 that includes a preference level for one or more resources and can use the preference level to prioritize time and/or frequency resources for subsequent sidelink resource allocation. In some examples, the UE 604 can receive the indication of non-preferred resources from the UE 606 and can relay that information to the base station 602. In some cases, the UE 606 can transmit the indication of non-preferred resources (e.g., from the UE 606 and/or from the UE 604) to the base station 602 using a Physical Uplink Control Channel (PUCCH).

In some examples, the UE 604 (e.g., sidelink transmitting UE) can determine non-preferred resources for sidelink communications based on information received from a receiving UE (e.g., the UE 606) that receives sidelink communications. For instance, UE 604 can implement a neural network (e.g., the neural network 400) that can be used to identify non-preferred time and/or frequency resources used for sidelink communications and/or to assign a preference level to time and/or frequency resources used for sidelink communications. In some aspects, the inputs to the neural network at the UE 604 can include data associated with measurements performed by the UE 606. For example, the inputs to the neural network can include Channel State Information (CSI), a PSFCH Acknowledgment (ACK) and/or Negative Acknowledgment (NACK), and/or any other measurement data provided by UE 606. In some configurations, the UE 604 can determine non-preferred resources for sidelink communications using any other type of artificial intelligence algorithm and/or any other processing or statistical analysis of data from the receiving UE (e.g., the UE 606). In some aspects, the UE 604 can send an indication of non-preferred resources to the base station 602 and the base station 602 can avoid and/or de-prioritize non-preferred resources in subsequent grants for sidelink transmission from the UE 604 to the UE 606.

In some aspects, the base station 602 can determine non-preferred resources for sidelink communications based on information received from the UE 604 and/or the UE 606. In one illustrative example, the base station 602 can implement a neural network (e.g., neural network 400) that can be used to identify non-preferred time and/or frequency resources used for sidelink communications and/or to assign a preference level to time and/or frequency resources used for sidelink communications. In some aspects, the inputs to the neural network at the base station 602 can include data associated with measurements performed by the UE 606. For example, the inputs to the neural network can include Channel State Information, PSFCH Acknowledgment (ACK) and/or Negative Acknowledgment (NACK) and/or any other measurement data provided by a UE (e.g., the UE 604 and/or the UE 606). In some configurations, the base station 602 can determine non-preferred resources for sidelink communications using any other type of artificial intelligence algorithm and/or any other processing or statistical analysis of data from one or more UEs.

In some examples, the base station 602 can use the preference level associated with one or more resources to perform tone-reservation for reduction of peak to average power ratio (PAPR). For example, the base station 602 can reserve one or more non-preferred resources (e.g., resources associated with a low preference level) in order to minimize the PAPR of a transmission (e.g., no data is transmitted using reserved resources).

In some examples, the UE 608 and the UE 610 can be configured to perform sidelink communications using a mode (e.g., mode 2) in which a UE can autonomously select sidelink radio resources. In some aspects, mode 2 of sidelink communications can be implemented outside of coverage area 612 (e.g., UE 608 and UE 610 are not associated with base station 602. In such aspects, mode 1 of sidelink communications can be implemented inside of coverage area 612. In some examples, the UE 608 and/or the UE 610 can select radio resources (e.g., frame(s), sub-carrier(s), etc.) for sidelink communications from a resource pool. In some cases, the resource pool for performing sidelink communications autonomously can be pre-configured by a base station (e.g., base station 602) when UE 608 and/or UE 610 are associated with the base station (e.g., within coverage area 612).

In one illustrative example, the UE 608 can autonomously select one or more sidelink resources for sending sidelink transmissions to the UE 610. In some aspects, the UE 610 can perform one or more measurements associated with the sidelink communications. For example, the UE 606 can measure received signal strength, signal to interference ratio, signal to noise ratio, signal throughput, location data, environmental conditions, mobility status, serving cell signal strength, neighbor cell signal strength, etc. As noted above with respect to the UE 606, the UE 610 can use one or more of the measurements associated with the sidelink communications to identify non-preferred resources (e.g., slot(s), frame(s), frequency sub-carrier(s), resource element(s), resource block(s), etc.) associated with the sidelink transmissions. In some aspects, UE 610 can implement a neural network (e.g., neural network 400) that can be configured to identify non-preferred time and/or frequency resources used for sidelink communications and/or to assign a preference level to time and/or frequency resources used for sidelink communications.

In some examples, UE 610 can provide an indication of non-preferred resources to UE 610. In some cases, the indication can be provided via the PSCCH or the PSSCH. In some aspects, the indication can be provided implicitly using the Sidelink Channel State Information Reference Signal (SL CSI-RS). For example, one or more CSI-RS sequences can be mapped to one or more time and/or frequency resources that are non-preferred (e.g., a CSI-RS sequence can be mapped to a rate matching pattern). In some aspects, the mapping of CSI-RS sequences to non-preferred time and/or frequency resources can be pre-configured or the mapping can be determined by the UEs (e.g., UE 608 and UE 610).

In some aspects, the transmitting UE in mode 2 sidelink configuration (e.g., UE 608) can determine non-preferred resources for sidelink communications based on information received from the receiving UE (e.g., UE 610). For instance, UE 608 can implement a neural network (e.g., neural network 400) that can be used to identify non-preferred time and/or frequency resources used for sidelink communications and/or to assign a preference level to time and/or frequency resources used for sidelink communications. In some aspects, the inputs to the neural network at UE 608 can include data associated with measurements performed by UE 610. For example, the inputs to the neural network can include Channel State Information, PSFCH Acknowledgment (ACK) and/or Negative Acknowledgment (NACK) and/or any other measurement data provided by UE 610. In some configurations, UE 608 can determine non-preferred resources for sidelink communications using any other type of artificial intelligence algorithm and/or any other processing or statistical analysis of data from the receiving UE (e.g., UE 610).

In some examples, the transmitting UE in the mode 2 sidelink configuration (e.g., UE 608) can exclude one or more non-preferred resources from the transmission resources that are selected for subsequent sidelink communications with a receiving UE (e.g., UE 610). In some aspects, UE 608 can select one or more resources for subsequent sidelink communications based on a preference level that is associated with one or more time/frequency resources. For example, UE 608 can select a subcarrier having a preference level of two over a subcarrier having a preference level of zero (e.g., using a scale in which a higher preference level is favored by UE 610). In some aspects, the non-preferred resources and/or the preference level associated with one or more resources can be updated periodically (e.g., measurements obtained at pre-determined time intervals) or on-demand (e.g., the UE 608 detects a change in one or more conditions). In some examples, the UE 608 can dynamically adjust the time/frequency resources used for sidelink communications based on changes to the non-preferred resources and/or the preference levels associated with the resources.

Figure 7:
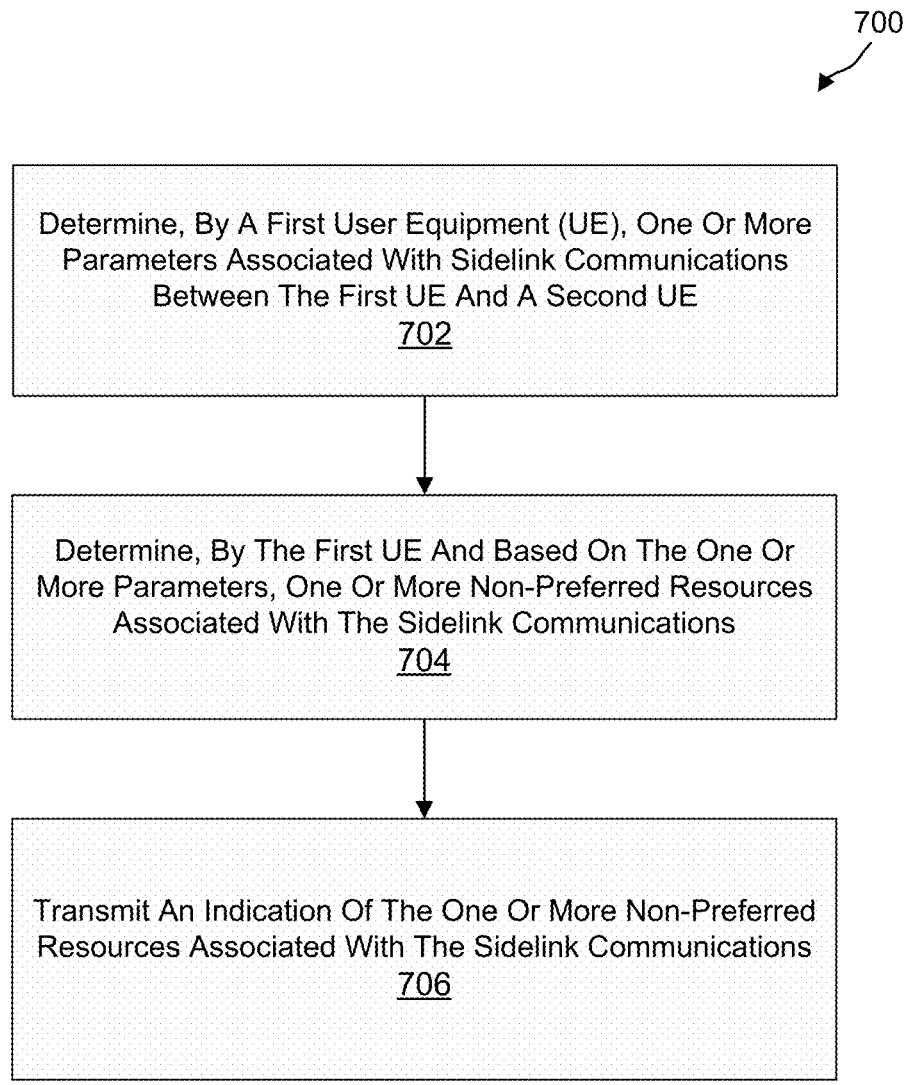
FIG. 7 is a flow diagram illustrating an example of a process for determining non-preferred resources for sidelink communications, in accordance with some examples.

FIG. 7 is a flow diagram illustrating an example of a process 700 for determining non-preferred resources for sidelink communications. At block 702, the process 700 includes determining, by a first user equipment (UE), one or more parameters associated with sidelink communications between the first UE and a second UE. In some aspects, the first UE can correspond to UE 604 or UE 606, which can be configured to operate using mode 1 sidelink configuration in which base station 602 selects and manages sidelink resources. In some cases, the first UE can correspond to UE 608 or UE 610, which can be configured to operate using mode sidelink configuration in which a UE may autonomously select sidelink resources. In some examples, determining the one or more parameters associated with the sidelink communications can include obtaining a plurality of measurements associated with the sidelink communications during a period of time, wherein the plurality of measurements includes at least one of a received signal strength, a signal to interference ratio, a signal to noise ratio, a signal throughput, a location data, or any combination thereof.

At block 704, the process 700 includes determining, by the first UE and based on the one or more parameters, one or more non-preferred resources associated with the sidelink communications. For example, UE 606 can determine one or more non-preferred resources associated with sidelink communications from UE 604. In some cases, UE 606 can determine non-preferred resources based on one or more parameters or measurements (e.g., received signal strength, a signal to interference ratio, a signal to noise ratio, a signal throughput, a location data, etc.) associated with sidelink communications. In some examples, the one or more non-preferred resources can include at least one of a frequency subcarrier, a resource element, a resource block, or any combination thereof. In some cases, the one or more non-preferred resources can be associated with a preference level (e.g., a scale indicating a level of preference). In some aspects, a machine learning model (e.g., neural network 400) can be used to determine the one or more non-preferred resources.

At block 706, the process 700 includes transmitting an indication of the one or more non-preferred resources associated with the sidelink communications. In some examples, the indication of the one or more non-preferred resources can be transmitted to a base station, wherein the base station allocates transmission resources used by the second UE for the sidelink communications. For example, UE 606 can transmit the indication to base station 602 and base station 602 can allocate transmission resources used by UE 604. In some aspects, the indication can be transmitted to the base station using a Physical Uplink Control Channel (PUCCH). In some aspects, the indication of the one or more non-preferred resources can be transmitted to the second UE, wherein the second UE selects transmission resources for the sidelink communications. For example, UE 610 can transmit the indication to UE 608 and UE 608 can select transmission resources for sidelink communications. In some examples, the indication of the one or more non-preferred resources can be provided to the second UE via at least one of a Physical Sidelink Control Channel (PSCCH) or a Physical Sidelink Shared Channel (PSSCH). In some aspects, the indication of the one or more non-preferred resources can be based on a Channel State Information Reference Signal (CSI-RS) sequence.

In some examples, the process can include determining, based on the one or more parameters, an inter-cell interference associated with at least one of the one or more non-preferred resources. For example, UE 104 can determine inter-cell interference from neighboring base station 102. In some aspects, the process can include determining, based on the one or more parameters, a frequency selectivity associated with at least one of the one or more non-preferred resources.

In some cases, the process can include determining a change in at least one of the one or more parameters associated with the sidelink communications from the second UE and, in response to the change, updating the one or more non-preferred resources associated with the sidelink communications. For example, UE 606 can determine a change in a parameter (e.g., signal to noise ratio, signal strength, signal throughput, etc.) associated with sidelink transmissions from UE 604 and, in response, UE 606 can update the one or more resources. In one example, a time and/or frequency resource that was previously designated as non-preferred can be removed from the list of non-preferred resources or can otherwise be designated as a preferred resource.

Figure 8:
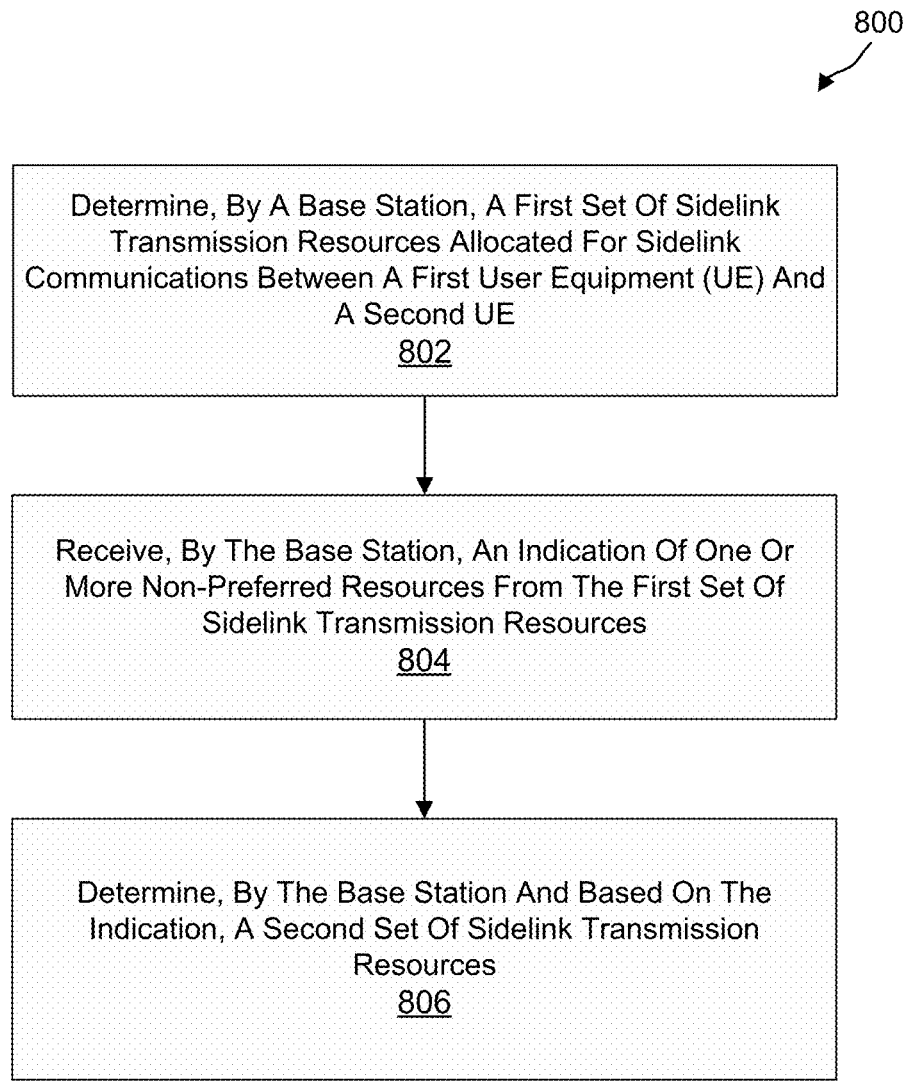
FIG. 8 is a flow diagram illustrating another example of a process for determining non-preferred resources for sidelink communications, in accordance with some examples.

FIG. 8 is a flow diagram illustrating an example of a process 800 for determining non-preferred resources for sidelink communications. At block 802, the process 800 includes determining, by a base station, a first set of sidelink transmission resources allocated for sidelink communications between a first user equipment (UE) and a second UE. For example, base station 602 can determine a first set of sidelink transmission resources (e.g., frame, sub-carrier, transport block, resource element, etc.) for sidelink communications between UE 604 and UE 606.

At block 804, the process 800 includes receiving, by the base station, an indication of one or more non-preferred resources from the first set of sidelink transmission resources. In some examples, the indication of the one or more non-preferred resources is received via a Physical Uplink Control Channel (PUCCH). In some examples, the indication of the one or more non-preferred resources includes one or more measurements from at least one of the first UE and the second UE. In some aspects, the one or more measurements can include at least one of channel state information (CSI), acknowledgment (ACK) data, negative acknowledgment (NACK) data, or any combination thereof. For example, UE 604 and/or UE 606 can send measurements (e.g., CSI data) to base station 602.

In some cases, the process can include determining, based on the one or more measurements, at least one of a frequency subcarrier, a resource element, and a resource block that is associated with the one or more non-preferred resources. For example, base station 602 can process the one or more measurements to determine time and/or frequency resources that are associated with the non-preferred resources. In some aspects, base station 602 can implement a neural network (e.g., neural network 400) that can be used to determine non-preferred resources and/or a preference level associated with time and/or frequency resources.

At block 806, the process 800 includes determining, by the base station and based on the indication, a second set of sidelink transmission resources. In some examples, the indication of the one or more non-preferred resources can identify at least one of a frequency subcarrier, a resource element, and a resource block that is excluded from the second set of sidelink transmission resources. For example, UE 606 can implement a neural network that can be used to determine non-preferred sidelink resources and can provide an indication to base station 602 that identifies the non-preferred resources. In some aspects, base station 602 can allocate a new set of resources for UE 604 to perform sidelink communications with UE 606, which can exclude one or more non-preferred resources that were identified based on the indication.

In some examples, the process can include allocating at least a portion of the one or more non-preferred resources for tone reservation, wherein the tone reservation is used to reduce a peak to average power ratio (PAPR). For example, base station 602 can allocate a portion of the non-preferred resources identified by UE 606 for tone reservation.

Figure 9:
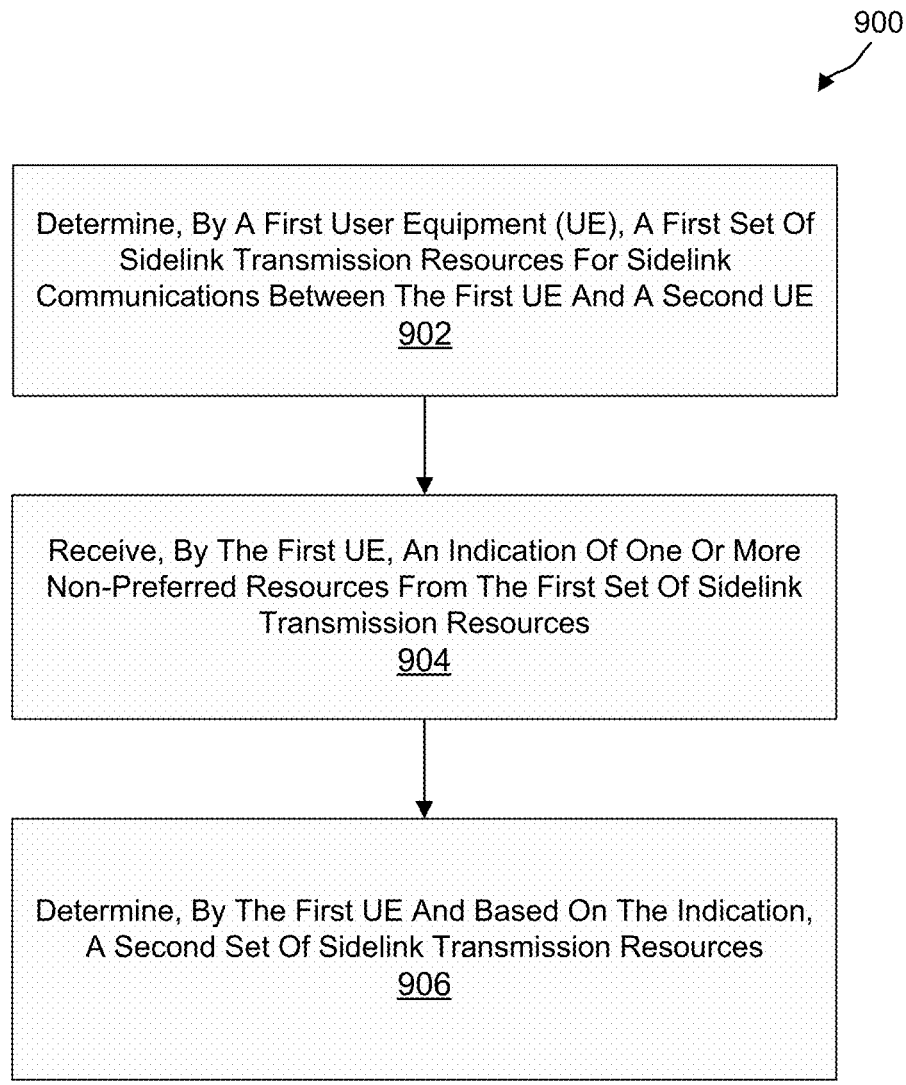
FIG. 9 is a flow diagram illustrating another example of a process for determining non-preferred resources for sidelink communications, in accordance with some examples.

FIG. 9 is a flow diagram illustrating an example of a process 900 for determining non-preferred resources for sidelink communications. At block 902, the process 900 includes determining, by a first user equipment (UE), a first set of sidelink transmission resources for sidelink communications between the first UE and a second UE. For example, UE 608 can be configured to perform sidelink communications in mode and can autonomously select transmission resources for performing sidelink communications with UE 610.

At block 904, the process 900 includes receiving, by the first UE, an indication of one or more non-preferred resources from the first set of sidelink transmission resources. In some examples, the indication can be received via at least one of a Physical Sidelink Control Channel (PSCCH) or a Physical Sidelink Shared Channel (PSSCH). In some aspects, the indication can include at least one of channel state information (CSI), acknowledgement (ACK) data, negative acknowledgment (NACK) data, or any combination thereof. In some cases, the first UE can use the indication to determine the non-preferred resources. For example, UE 608 can implement a neural network that can receive input data including the indication and can determine the non-preferred resources (e.g., sub-carrier(s), frame(s), resource block(s), resource element(s), etc.).

In some examples, the indication of the one or more non-preferred resources can identify one or more time and/or frequency resources that are non-preferred. For example, UE 610 can implement a neural network that can be used to identify non-preferred time and/or frequency resources and/or determine a preference level associated with one or more time and/or frequency resources. In some aspects, UE 610 can send an indication to UE 608 that identifies the non-preferred resources. In some examples, the indication of the non-preferred resources can be based on a Channel State Information Reference Signal (CSI-RS) sequence.

At block 906, the process 900 includes determining, by the first UE and based on the indication, a second set of sidelink transmission resources. In some aspects, the second set of transmission resources can exclude at least a portion of the non-preferred resources. For example, UE 608 can determine a second set of transmission resources for performing sidelink communications with UE 610 and the second set of transmission resources can exclude a portion of the non-preferred resources.

In some examples, the processes described herein (e.g., process 500, process 700, process 800, process 900 and/or other process described herein) may be performed by a computing device or apparatus (e.g., a UE or a base station). In one example, the process 500, 700, 800 and/or process 900 can be performed by the base station 102 of FIG. 2, the UE 104 of FIG. 2 and/or the wireless device 1007 of FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 700, 800, and 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 500, process 700, process 800, process 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
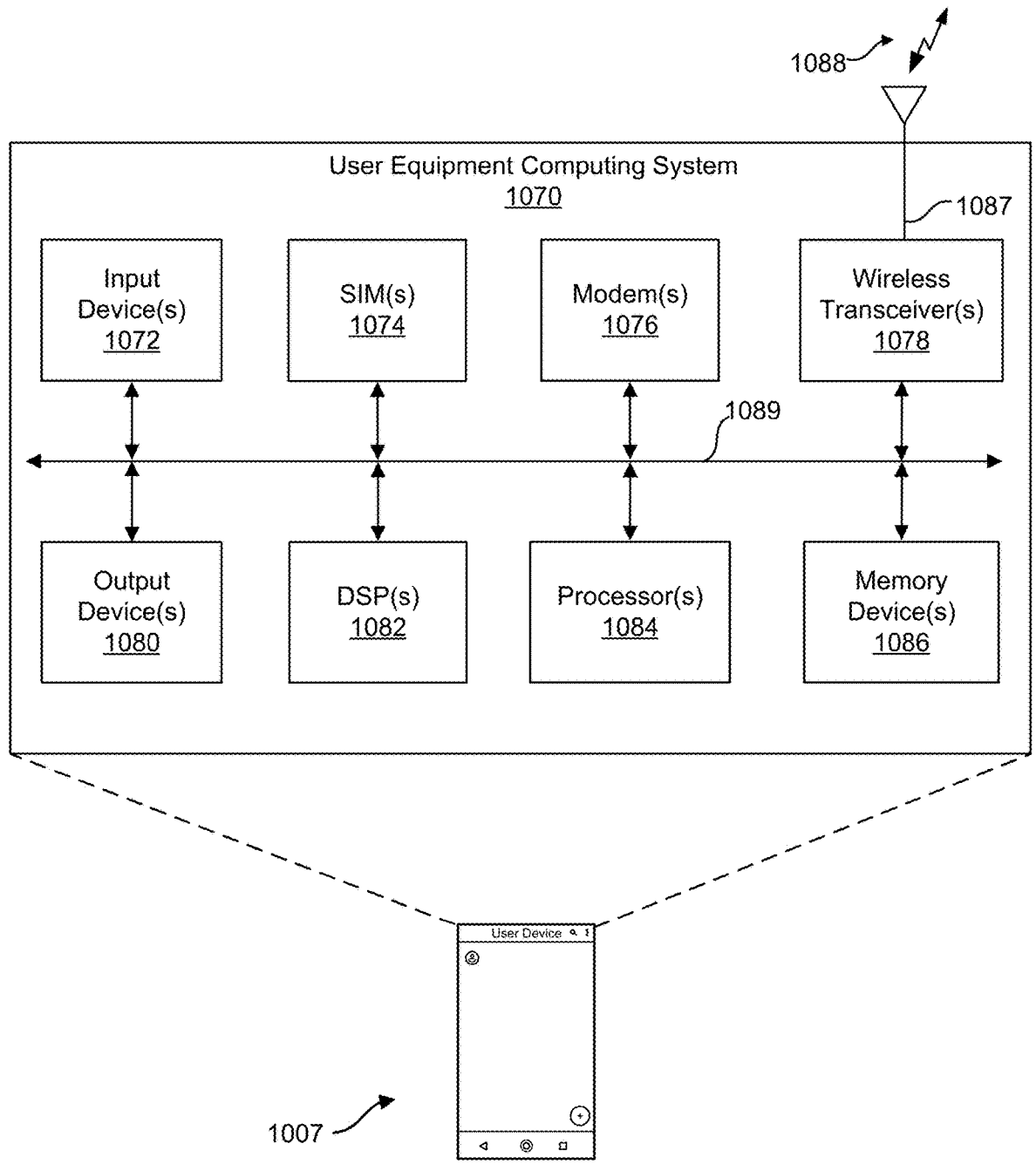
FIG. 10 is a block diagram illustrating components of a user equipment, in accordance with some examples.

FIG. 10 illustrates an example of a computing system 1070 of a wireless device 1007. The wireless device 1007 can include a client device such as a UE (e.g., UE 104, UE 152, UE 190) or other type of device (e.g., a station (STA) configured to communication using a Wi-Fi interface) that can be used by an end-user. Wireless device can also include network devices (e.g., base stations such as eNBs and/or gNBs, Wi-Fi access points (APs) such as routers, range extenders or the like, etc.). For example, the wireless device 1007 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 1070 includes software and hardware components that can be electrically or communicatively coupled via a bus 1089 (or may otherwise be in communication, as appropriate). For example, the computing system 1070 includes one or more processors 1084. The one or more processors 1084 can include one or more CPUs, ASICs, FPGAs, APs, GPUs, VPUs, NSPs, microcontrollers, dedicated hardware, any combination thereof, and/or other processing device or system. The bus 1089 can be used by the one or more processors 1084 to communicate between cores and/or with the one or more memory devices 1086.

The computing system 1070 may also include one or more memory devices 1086, one or more digital signal processors (DSPs) 1082, one or more subscriber identity modules (SIMs) 1074, one or more modems 1076, one or more wireless transceivers 1078, one or more antennas 1087, one or more input devices 1072 (e.g., a camera, a mouse, a keyboard, a touch sensitive screen, a touch pad, a keypad, a microphone, and/or the like), and one or more output devices 1080 (e.g., a display, a speaker, a printer, and/or the like).

In some aspects, computing system 1070 can include one or more radio frequency (RF) interfaces configured to transmit and/or receive RF signals. In some examples, an RF interface can include components such as modem(s) 1076, wireless transceiver(s) 1078, and/or antennas 1087. The one or more wireless transceivers 1078 can transmit and receive wireless signals (e.g., signal 1088) via antenna 1087 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 1070 can include multiple antennas or an antenna array that can facilitate simultaneous transmit and receive functionality. Antenna 1087 can be an omnidirectional antenna such that radio frequency (RF) signals can be received from and transmitted in all directions. The wireless signal 1088 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 1088 may be transmitted directly to other wireless devices using sidelink communications (e.g., using a PC5 interface, using a DSRC interface, etc.). Wireless transceivers 1078 can be configured to transmit RF signals for performing sidelink communications via antenna 1087 in accordance with one or more transmit power parameters that can be associated with one or more regulation modes. Wireless transceivers 1078 can also be configured to receive sidelink communication signals having different signal parameters from other wireless devices.

In some examples, the one or more wireless transceivers 1078 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1088 into a baseband or intermediate frequency and can convert the RF signals to the digital domain.

In some cases, the computing system 1070 can include a coding-decoding device (or CODEC) configured to encode and/or decode data transmitted and/or received using the one or more wireless transceivers 1078. In some cases, the computing system 1070 can include an encryption-decryption device or component configured to encrypt and/or decrypt data (e.g., according to the AES and/or DES standard) transmitted and/or received by the one or more wireless transceivers 1078.

The one or more SIMs 1074 can each securely store an international mobile subscriber identity (IMSI) number and related key assigned to the user of the wireless device 1007. The IMSI and key can be used to identify and authenticate the subscriber when accessing a network provided by a network service provider or operator associated with the one or more SIMs 1074. The one or more modems 1076 can modulate one or more signals to encode information for transmission using the one or more wireless transceivers 1078. The one or more modems 1076 can also demodulate signals received by the one or more wireless transceivers 1078 in order to decode the transmitted information. In some examples, the one or more modems 1076 can include a Wi-Fi modem, a 4G (or LTE) modem, a 5G (or NR) modem, and/or other types of modems. The one or more modems 1076 and the one or more wireless transceivers 1078 can be used for communicating data for the one or more SIMs 1074.

The computing system 1070 can also include (and/or be in communication with) one or more non-transitory machine-readable storage media or storage devices (e.g., one or more memory devices 1086), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 1086 and executed by the one or more processor(s) 1084 and/or the one or more DSPs 1082. The computing system 1070 can also include software elements (e.g., located within the one or more memory devices 1086), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 1007 can include means for performing operations described herein. The means can include one or more of the components of the computing system 1070. For example, the means for performing operations described herein may include one or more of input device(s) 1072, SIM(s) 1074, modems(s) 1076, wireless transceiver(s) 1078, output device(s) (1080), DSP(s) 1082, processors (1084), memory device(s) 1086, and/or antenna(s) 1087.

In some aspects, wireless device 1007 can include: means for determining one or more parameters associated with sidelink communications between the wireless device and a UE; means for determining, based on the one or more parameters, one or more non-preferred resources associated with the sidelink communications; and means for transmitting an indication of the one or more non-preferred resources associated with the sidelink communications. In some examples, the means for determining can include the one or more processors 1084, the one or more DSPs 1082, the one or more memory devices 1086, any combination thereof, or other component(s) of the wireless device. In some examples, the means for transmitting can include the one or more wireless transceivers 1078, the one or more modems 1076, the one or more SIMs 1074, the one or more processors 1084, the one or more DSPs 1082, the one or more memory devices 1086, any combination thereof, or other component(s) of the wireless device.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for wireless communications, comprising: at least one memory; at least one transceiver; and at least one processor coupled to the at least one memory and the at least one transceiver, the at least one processor configured to: determine one or more parameters associated with sidelink communications between the apparatus and a user equipment (UE); determine, based on the one or more parameters, one or more non-preferred resources associated with the sidelink communications; and transmit, via the at least one transceiver, an indication of the one or more non-preferred resources associated with the sidelink communications.

Aspect 2: The apparatus of aspect 1, wherein the indication of the one or more non-preferred resources is transmitted to a base station, wherein the base station allocates transmission resources used by the UE for the sidelink communications.

Aspect 3: The apparatus of any of aspects 1 to 2, wherein the indication of the one or more non-preferred resources is transmitted to the UE, wherein the UE selects transmission resources for the sidelink communications.

Aspect 4: The apparatus of any of aspects 1 to 3, wherein to determine the one or more parameters associated with the sidelink communications, the at least one processor is further configured to: obtain a plurality of measurements associated with the sidelink communications during a period of time, wherein the plurality of measurements includes at least one of a received signal strength, a signal to interference ratio, a signal to noise ratio, a signal throughput, a location data, or any combination thereof.

Aspect 5: The apparatus of any of aspects 1 to 4, wherein the one or more non-preferred resources include at least one of a frequency subcarrier, a resource element, a resource block, or any combination thereof.

Aspect 6: The apparatus of any of aspects 1 to 5, wherein each of the one or more non-preferred resources is associated with a preference level.

Aspect 7: The apparatus of any of aspects 1 to 6, wherein the at least one processor is further configured to: determine, based on the one or more parameters, an inter-cell interference associated with at least one of the one or more non-preferred resources.

Aspect 8: The apparatus of any of aspects 1 to 7, wherein the at least one processor is further configured to: determine a change in at least one of the one or more parameters associated with the sidelink communications from the UE; and in response to the change, updating the one or more non-preferred resources associated with the sidelink communications.

Aspect 9: An apparatus for wireless communications, comprising: at least one memory; at least one transceiver; and at least one processor coupled to the at least one memory and the at least one transceiver, the at least one processor configured to: determine a first set of sidelink transmission resources allocated for sidelink communications between a first user equipment (UE) and a second UE; receive, via the at least one transceiver, an indication of one or more non-preferred resources from the first set of sidelink transmission resources; and determine, based on the indication, a second set of sidelink transmission resources.

Aspect 10: The apparatus of aspect 9, wherein the indication of the one or more non-preferred resources includes one or more measurements from at least one of the first UE and the second UE.

Aspect 11: The apparatus of aspect 10, wherein the one or more measurements include at least one of channel state information (CSI), acknowledgment (ACK) data, negative acknowledgment (NACK) data, or any combination thereof.

Aspect 12: The apparatus of any of aspects 10 to 11, wherein the at least one processor is further configured to: determine, based on the one or more measurements, at least one of a frequency subcarrier, a resource element, and a resource block associated with the one or more non-preferred resources.

Aspect 13: The apparatus of any of aspects 9 to 12, wherein the indication of the one or more non-preferred resources is received via a Physical Uplink Control Channel (PUCCH).

Aspect 14: The apparatus of any of aspects 9 to 13, wherein the indication of the one or more non-preferred resources identifies at least one of a frequency subcarrier, a resource element, and a resource block that is excluded from the second set of sidelink transmission resources.

Aspect 15: The apparatus of any of aspects 9 to 14, wherein the at least one processor is further configured to: allocate at a least a portion of the one or more non-preferred resources for tone reservation, wherein the tone reservation is used to reduce a peak to average power ratio (PAPR).

Aspect 16: A method of performing any of the operations of aspects 1 to 15.

Aspect 17: A computer-readable storage medium storing instructions that, when executed, cause one or more processors to perform any of the operations of aspects 1 to 15.

Aspect 18: An apparatus comprising means for performing any of the operations of aspects 1 to 15.

What is claimed is:

1. A method for wireless communications, comprising:
receiving, by a first user equipment (UE) from a network device, an indication of one or more resources allocated to the first UE for performing sidelink communications;
determining, by the first UE, one or more parameters associated with sidelink communications between the first UE and a second UE;
determining, by the first UE, based on the one or more resources allocated to the first UE and based on the one or more parameters, one or more non-preferred resources associated with the sidelink communications, the one or more non-preferred resources comprising one or more resources to be excluded from subsequent sidelink communications between the first UE and the second UE;
transmitting, by the first UE, to the network device, an indication of the one or more non-preferred resources associated with the sidelink communications; and
receiving, by the first UE, from the network device, an indication of transmission resources allocated to the first UE for performing the subsequent sidelink communications based on the indication of the one or more non-preferred resources.

2. The method of claim 1, wherein determining the one or more non-preferred resources associated with the sidelink communications comprises:
determining the one or more parameters based on obtaining a plurality of measurements associated with the sidelink communications during a period of time, wherein the plurality of measurements includes at least one of a received signal strength, a signal to interference ratio, a signal to noise ratio, a signal throughput, a location data, or any combination thereof; and
determining, based on a machine learning model using the plurality of measurements as input, the one or more non-preferred resources associated with sidelink communications.

3. The method of claim 2, wherein determining the one or more non-preferred resources based on the machine learning model using the plurality of measurements as input comprises:
processing, using the machine learning model, the plurality of measurements to generate a preference level for the one or more resources allocated to the first UE; and
determining, based on the preference level, the one or more non-preferred resources from the one or more resources.

4. The method of claim 1, wherein the one or more non-preferred resources include at least one of a frequency subcarrier, a resource element, a resource block, or any combination thereof.

5. The method of claim 1, wherein each of the one or more non-preferred resources is associated with a preference level.

6. The method of claim 1, further comprising:
determining, based on the one or more parameters, an inter-cell interference associated with at least one of the one or more non-preferred resources.

7. The method of claim 1, further comprising:
determining a change in at least one of the one or more parameters associated with the sidelink communications from the second UE; and
in response to the change, updating the one or more non-preferred resources associated with the sidelink communications.

8. An apparatus for wireless communications, comprising:
at least one memory;
at least one transceiver; and
at least one processor coupled to the at least one memory and the at least one transceiver, the at least one processor configured to:
receive, from a network device, an indication of one or more resources allocated to the apparatus for performing sidelink communications;
determine one or more parameters associated with sidelink communications between the apparatus and a user equipment (UE);
determine, based on the one or more resources allocated to the apparatus and based on the one or more parameters, one or more non-preferred resources associated with the sidelink communications, the one or more non-preferred resources comprising one or more resources to be excluded from subsequent sidelink communications between the apparatus and the UE;
transmit, via the at least one transceiver to the network device, an indication of the one or more non-preferred resources associated with the sidelink communications; and
receive, from the network device, an indication of transmission resources allocated to the apparatus for performing the subsequent sidelink communications based on the indication of the one or more non-preferred resources.

9. The apparatus of claim 8, wherein to determine the one or more non-preferred resources associated with the sidelink communications, the at least one processor is further configured to:
determine the one or more parameters based on obtaining a plurality of measurements associated with the sidelink communications during a period of time, wherein the plurality of measurements includes at least one of a received signal strength, a signal to interference ratio, a signal to noise ratio, a signal throughput, a location data, or any combination thereof; and
determine, based on a machine learning model using the plurality of measurements as input, the one or more resources associated with sidelink communications.

10. The apparatus of claim 9, wherein, to determine the one or more non-preferred resources based on the machine learning model using the plurality of measurements as input, the at least one processor is configured to:
process, using the machine learning model, the plurality of measurements to generate a preference level for the one or more resources allocated to the apparatus; and
determine, based on the preference level, the one or more non-preferred resources from the one or more resources.

11. The apparatus of claim 8, wherein the one or more non-preferred resources include at least one of a frequency subcarrier, a resource element, a resource block, or any combination thereof.

12. The apparatus of claim 8, wherein each of the one or more non-preferred resources is associated with a preference level.

13. The apparatus of claim 8, wherein the at least one processor is further configured to:
determine, based on the one or more parameters, an inter-cell interference associated with at least one of the one or more non-preferred resources.

14. The apparatus of claim 8, wherein the at least one processor is further configured to:
determine a change in at least one of the one or more parameters associated with the sidelink communications from the UE; and
in response to the change, update the one or more non-preferred resources associated with the sidelink communications.

15. A method of wireless communications by a network device, comprising:
transmitting, by a network device, an indication of a first set of sidelink transmission resources allocated for sidelink communications between a first user equipment (UE) and a second UE;
receiving, by the network device, an indication of one or more non-preferred resources comprising one or more resources to be excluded from a second set of sidelink transmission resources between the first UE and the second UE; and
transmitting, by the network device, an indication of transmission resources allocated to the first UE for performing a second set of sidelink communications based on the indication of the one or more non-preferred resources.

16. The method of claim 15, wherein the indication of the one or more non-preferred resources includes one or more measurements from at least one of the first UE or the second UE.

17. The method of claim 16, wherein the one or more measurements include at least one of channel state information (CSI), acknowledgment (ACK) data, negative acknowledgment (NACK) data, or any combination thereof.

18. The method of claim 16, further comprising:
determining, based on the one or more measurements, at least one of a frequency subcarrier, a resource element, a resource block associated with the one or more non-preferred resources, or any combination thereof.

19. The method of claim 15, wherein the indication of the one or more non-preferred resources is received via a Physical Uplink Control Channel (PUCCH).

20. The method of claim 15, wherein the indication of the one or more non-preferred resources identifies at least one of a frequency subcarrier, a resource element, a resource block that is excluded from the second set of sidelink transmission resources, or any combination thereof.

21. The method of claim 15, further comprising:
allocating at a least a portion of the one or more non-preferred resources for tone reservation, wherein the tone reservation is used to reduce a peak to average power ratio (PAPR).

22. The method of claim 15, wherein each of the one or more non-preferred resources is associated with a preference level.

23. An apparatus for wireless communications, comprising:
at least one memory;
at least one transceiver; and
at least one processor coupled to the at least one memory and the at least one transceiver, the at least one processor configured to:
transmit, via the at least one transceiver, an indication of a first set of sidelink transmission resources allocated for sidelink communications between a first user equipment (UE) and a second UE;
receive, via the at least one transceiver, an indication of one or more non-preferred resources comprising one or more resources to be excluded from a second set of sidelink transmission resources between the first UE and the second UE; and
transmit, via the at least one transceiver, an indication of transmission resources allocated to the first UE for performing a second set of sidelink communications based on the indication of the one or more non-preferred resources.

24. The apparatus of claim 23, wherein the indication of the one or more non-preferred resources includes one or more measurements from at least one of the first UE or the second UE.

25. The apparatus of claim 24, wherein the one or more measurements include at least one of channel state information (CSI), acknowledgment (ACK) data, negative acknowledgment (NACK) data, or any combination thereof.

26. The apparatus of claim 24, wherein the at least one processor is further configured to:
determine, based on the one or more measurements, at least one of a frequency subcarrier, a resource element, and a resource block associated with the one or more non-preferred resources, or any combination thereof.

27. The apparatus of claim 23, wherein the indication of the one or more non-preferred resources is received via a Physical Uplink Control Channel (PUCCH).

28. The apparatus of claim 23, wherein the indication of the one or more non-preferred resources identifies at least one of a frequency subcarrier, a resource element, and a resource block that is excluded from the second set of sidelink transmission resources, or any combination thereof.

29. The apparatus of claim 23, wherein the at least one processor is further configured to:
allocate at a least a portion of the one or more non-preferred resources for tone reservation, wherein the tone reservation is used to reduce a peak.

30. The apparatus of claim 23, wherein each of the one or more non-preferred resources is associated with a preference level.

* * * * *